United States Patent

Siessl et al.

[11] Patent Number: 5,878,854
[45] Date of Patent: Mar. 9, 1999

[54] COLLECTOR SHOE FOR COLLECTOR AND PROCESS FOR PRODUCING IT

[75] Inventors: Wolfgang Siessl, Traunkirchen; Hans Rastl, Bad Goisern, both of Austria

[73] Assignee: Hoffmann & Co. Elektrokohle Ges. m.b.H., Austria

[21] Appl. No.: 809,542

[22] PCT Filed: Jul. 31, 1996

[86] PCT No.: PCT/EP96/03372

§ 371 Date: Mar. 20, 1997

§ 102(e) Date: Mar. 20, 1997

[87] PCT Pub. No.: WO97/06025

PCT Pub. Date: Feb. 20, 1997

[30] Foreign Application Priority Data

Aug. 8, 1995 [DE] Germany ............ 195 29 169.7

[51] Int. Cl.⁶ .................................................. B60L 5/08
[52] U.S. Cl. .................................................. 191/59.1
[58] Field of Search ................... 191/45 R, 59, 191/59.1, 60.4

[56] References Cited

U.S. PATENT DOCUMENTS

| | | | |
|---|---|---|---|
| 5,193,656 | 3/1993 | Hoffmann et al. | 191/59.1 |
| 5,263,562 | 11/1993 | Hoffmann et al. | 191/59.1 |
| 5,351,794 | 10/1994 | Deutzer | 191/59.1 |

FOREIGN PATENT DOCUMENTS

| | | | |
|---|---|---|---|
| 140894 | 10/1934 | Austria . | |
| 139525 | 11/1934 | Austria . | |
| 311 174 | 3/1918 | Germany . | |
| 431 365 | 7/1926 | Germany . | |
| 506 064 | 8/1930 | Germany . | |
| 671 946 | 2/1939 | Germany . | |
| 870128 | 7/1949 | Germany | 191/59.1 |
| 4336705 | 5/1995 | Germany . | |
| 233718 | 11/1944 | Switzerland | 191/59.1 |
| 387172 | 2/1933 | United Kingdom . | |
| 8911408 | 11/1989 | WIPO | 191/59.1 |
| WO 89/12559 | 12/1989 | WIPO . | |
| WO 89/12560 | 12/1989 | WIPO . | |

*Primary Examiner*—S. Joseph Morano
*Attorney, Agent, or Firm*—Townsend and Townsend and Crew

[57] ABSTRACT

A slipper for current collectors having an elongated carbon brush (1) which has a hollow space surrounded on at least three sides by the brush and a carrier (3) disposed in the hollow space for supporting the carbon brush. The slipper is constructed by providing a blank of the carrier which has a cross-section that is smaller than the cross-section of the hollow space of the carbon brush. It is inserted into the hollow space and deformed so that its cross-section expands into contact with at least a portion of the surfaces of the hollow space defined by the carbon brush. An electrically conductive layer (5) can be arranged between the blank and at least a portion of the inner surfaces of the hollow space.

12 Claims, 3 Drawing Sheets

COLLECTOR SHOE FOR COLLECTOR AND PROCESS FOR PRODUCING IT

BACKGROUND OF THE INVENTION

1. Field of the Invention

This invention relates to a pantograph slipper or sliding strip for current collectors which have an elongated carrier and an elongated carbon brush supported by the carrier, as well as a method for the manufacture of the slipper.

2. Description of the Prior Art

Conventional pantograph slippers for current collectors, as used, for example, on electrically powered rail vehicles, are conventionally produced by securing a carbon brush to the upper side of a carrier which is usually made of metal. The brush is appropriately secured to the carrier, for example by bonding, soldering and/or mechanically wedging the two to each other. The carrier supports the carbon brush and is used for securing the slipper to a current collector.

The manufacture of such conventional slippers has several disadvantages. One disadvantage is that electric arcing can occur between the overhead wire touched by the slipper and exposed surfaces of the metal carrier. Moisture and especially ice that may form on the collector enhance the likelihood that arcing may take place. Such arcing can damage the slipper and particularly the metal carrier thereof. Another disadvantage results from differential thermal expansions of the carbon brush and the carrier. Operating temperature changes can differentially expand the two elements, which can lead to a deformation of the entire slipper similar to the manner in which bimetals bend as a result of temperature changes. This can cause mechanical damage, especially to the carbon brush, and can lead to a thermal overstressing of the bond between the brush and the carrier. Finally, the manufacture of conventional pantograph slippers is relatively costly, to a significant extent because a secure, permanent and highly stressable connection between the carbon brush and the separately manufactured carrier must be established.

Pantograph slippers which have interiorly arranged carriers are disclosed in German patents 431,365 and 671,946 as well as Austrian patents 139,525 and 140,894. These references disclose a tubular carbon brush made of serially arranged, multiple sections and a metal carrier which is disposed inside and surrounded by the brush. The carrier is tubular and it is secured to the brush in one of two ways. The carrier is either longitudinally slit and prestressed, so that it engages the inner surface of the brush (Austrian patent 139,525), or the space between the carrier and the brush is filled with a cast material (Austrian patent 140,894) if the brush or its segments are nonrotatably supported on the carrier (German patents 431,365 and 506,064). Since the carbon of the carbon brush can be subjected to only limited tension, the use of prestressed carriers on the hollow interior of the brush is relatively unsatisfactory. Further, the casting material between the carrier and the carbon brush does not form an optimal mechanical and electrical connection between the two.

SUMMARY OF THE INVENTION

It is an object of the present invention to provide a pantograph slipper which can be produced in an efficient and up-to-date manner and which can withstand today's electrical and mechanical loads while providing a secure connection between the carbon brush and the carrier arranged in the hollow interior of the brush.

The method of the present invention conforms the shape of the carrier in situ to the inner surfaces of the tubular brush. This assures a uniform, force-transmitting contact between the carrier and the inner surfaces of the brush which automatically compensates for the unavoidable tolerances in the cross-sectional dimensions of the hollow inner space. Upon completion of the manufacture, the carrier does not subject the carbon of the slipper to lasting tension. The carbon brush surrounds at least three sides of the carrier so that especially the longitudinal sides of the slipper have no exposed carrier surfaces where arcing to the overhead wire could occur. Further, differences in the thermal expansions of the brush and the carrier cannot deform the slipper because the carbon brush essentially surrounds all sides of the carrier.

DETAILED DESCRIPTION OF THE PREFERRED EXEMPLARY EMBODIMENTS

Figure 1:
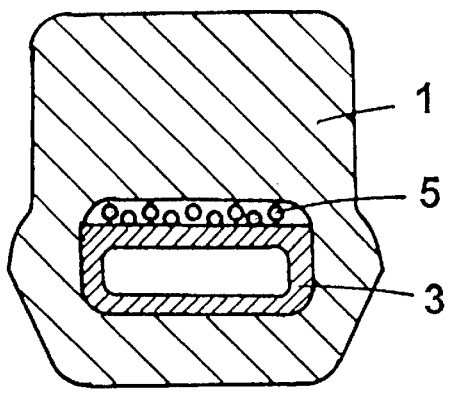
FIGS. 1 to 4 are cross-sections through different embodiments of pantograph slippers produced in accordance with the method of the present invention.

FIG. 1 shows a cross-section through a pantograph slipper made of a carbon brush 1 and a carrier 3. The carbon brush 1 is made of a carbon material as is conventional for current collectors, is made by pressing or extruding, and defines, in cross-section, a hollow space which extends over the full length of the brush. Thus, brush 1 has a tubular cross-section. The carbon brush 1 shown in FIG. 1 has a rectangular cross-section, but it can be given any other desired shape.

Carrier 3 is disposed in the hollow space defined by carbon brush 1. In the illustrated embodiment, it is hollow and has a rectangular cross-section and can be made of an electrically conducting or nonconducting material. The embodiment shown in FIG. 1 further has a longitudinally extending electrically conducting layer 5 disposed inside the hollow space of the carbon brush and on the upper side of carrier 3. It is particularly advantageous if the conductive layer 5 is a band of braided metal wire, as is indicated in FIG. 1. However, the electrically conductive layer can also be a metal-plated layer formed on the upper side of carrier 3 and/or on the inside surfaces defining the hollow space of carbon brush 1.

Carrier 3 can be made of electrically conductive or nonconductive material. If carrier 3 is made of electrically nonconductive material, for example fiber-reinforced resin, it is particularly advantageous to provide an electrically conductive layer 5 for conducting electric current collected by carbon brush 1 from the overhead wire (not shown) in a longitudinal direction of the brush to contacts located at the ends of the pantograph slipper. If carrier 3 is made of an electrically conductive material, for example foamed aluminum, the electrically conductive layer 5 is not absolutely necessary. It can nevertheless be advantageous to provide it to facilitate the current flow from carbon brush 1 to carrier 3.

In accordance with the present invention, the pantograph slipper shown in FIG. 1 is manufactured as follows:

A tubular carrier blank is premanufactured, for example of a fiber-reinforced, uncured resin (so-called "prepreg"), and given a cross-section which is less than that of the hollow space of carbon brush 1. The blank is longitudinally slid into the hollow space of carbon brush 1 and a pressurized fluid, for example pressurized air or an alcohol-water mixture, is then applied to the inside of the blank to expand it outwardly until its exterior conforms to and is pressed against the inner surfaces forming the hollow space of the brush. In this condition the resin is cured, resulting in a carrier which completely conforms to the contour of the hollow space. Thus, the carrier is form-locked to the inside of the brush so that forces can readily be transmitted between them. The needed curing temperature, of, for example, 150° C., can be attained by heating the pressure medium and/or by heating carbon brush 1 from its exterior.

Instead of making the carrier of fiber-reinforced resin or plastic, it can also be made of aluminum foam, for example by following the above-described method employing the expanding effect of a pressure medium to deform the carrier and conform its exterior to that of the inside of the hollow space. The braided metal wire band 5 or the like which is used as a current conductor can be inserted into the hollow space of carbon brush 1 with or prior to the insertion of the carrier blank described above. By sufficiently softening the carrier blank during its pressure expansion, the resin enters the interstices of the metal fabric 5 so that the latter becomes embedded in resin.

A particular advantage of the present invention is that the carbon brush 1 which surrounds carrier 3 can be given any desired exterior form. In the embodiment illustrated in FIG. 1, a carbon brush has an outer cross-sectional contour which precisely conforms to that of brushes bonded onto the aluminum carriers of presently used pantograph slippers specified by the German Federal Railways. Carbon brush 1 can be given any desired shape, including aerodynamically advantageous outer contours, by extruding the brush through appropriately shaped orifices.

A further important advantage of the present invention results from the freely selectable cross-section for both the carbon brush and the carrier. This enables designers to optimize weight and mass distributions of the slipper by giving it the most appropriate shape for the anticipated operating conditions. In contrast to today's conventional slippers, which are universally made by bonding, soldering or wedging the brush to the carrier, a slipper made in accordance with the present invention can optionally be made so that it has the exactly same weight and weight distribution as presently used current collectors, to render the two interchangeable, or so that it is significantly lighter, having, for example, a weight of 30% or less than conventional collectors. These advantages afforded by the present invention can be used to significantly improve the dynamic performance of current collectors.

A further significant advantage of the present invention is that the carrier and its electric contact to the carbon brush are more stable and less affected by environmental factors, such as corrosive gases, aggressive dust, salt-containing fog, etc., because, unlike currently used collectors which have exposed metal or resin carriers, carbon material surrounds and protects all sides of the carrier of the present invention.

Figure 2:
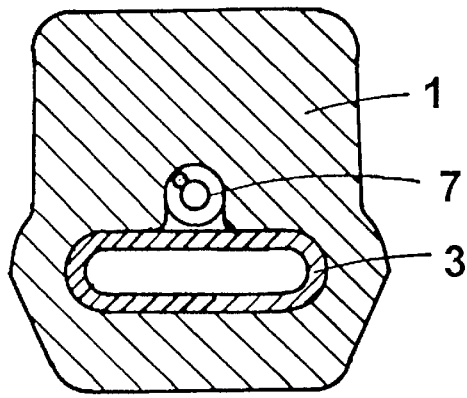

In the embodiment illustrated in FIG. 2, carbon brush 1 defines a longitudinal hollow space which, in cross-section, has a wide lower part and a generally circular upper part. A longitudinally extending carrier 3 is disposed in the lower part and is formed in a manner analogous to that described in connection with the embodiment shown in FIG. 1. The upper, circularly shaped part of the hollow space houses a longitudinally extending, elastically stretchable tubular member 7 which is prestressed against the inner surface of carbon brush 1 and serves as an electric conductor for flowing current from the overhead wire in a longitudinal direction of the carbon brush. The tubular member 7 is inserted into the hollow space while elastically stretched in its longitudinal direction. Upon its relaxation the elongated member returns to its original shape, causing the member to expand itself into contact with carbon brush 1.

The embodiment shown in FIG. 2 permits use of the upper, circularly shaped portion of the hollow space as a rupture detection channel. For this purpose, a device is coupled to an end of carbon brush 1 which maintains a constant, predetermined gas pressure in the hollow space. Should a crack develop in carbon brush 1, or should the brush be worn to the extent that the hollow space becomes exposed, the gas pressure drops. This can be detected, thereby signalling damage to or excessive wear of the carbon brush. Appropriate rupture detection devices are known to those of ordinary skill in the art.

Figure 3:
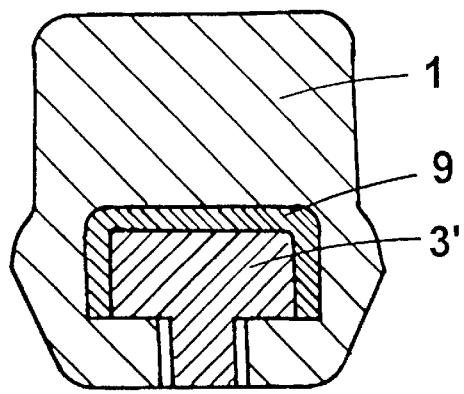

In the embodiment illustrated in FIG. 3, carbon brush 1 includes a downwardly open slot so that it does not completely surround its inner hollow space. Accordingly, the carbon brush shown in FIG. 3 is C-shaped. Carrier 3' disposed in the hollow space of the brush forms a relatively massive, T-shaped bar. Carrier 3' may, for example, be made of foamed plastic, resin or aluminum. An electrically conductive layer 9 for flowing current collected from an overhead wire is arranged in the hollow interior of carbon brush 1 between its inner surfaces and carrier 3'. If carrier 3' is made of an electrically conductive material, layer 5 can be omitted.

Figure 4:
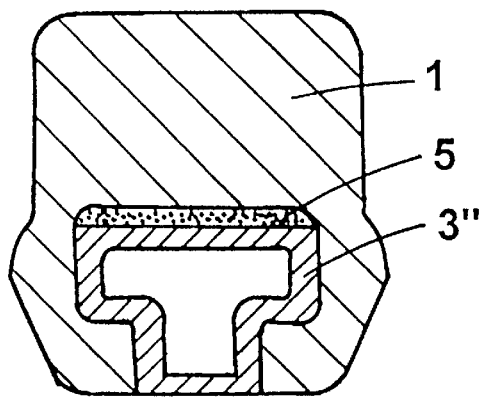

FIG. 4 illustrates a carbon brush 1 which has a C-shaped cross-section as is shown in FIG. 3. Carrier 3" is assembled with the brush in the same manner as is described in connection with the embodiment of the invention shown in FIG. 1. Carrier 3' is supplied as a tubular blank, made for example of fiber-reinforced resin, which is inserted in the hollow interior space of carbon brush 1 and expanded with pressurized air into intimate contact with the inner surfaces of the carbon brush, including the lateral sides which define the downwardly open slit of the brush. Following the curing of the resin, the T-shaped carrier 3' completely closes the downwardly open hollow space of the brush. As is shown in and described in connection with FIG. 1, carrier 3 can also be fitted with an electric conductor for flowing current from brush 1 to the ends of the slipper.

Figure 5:
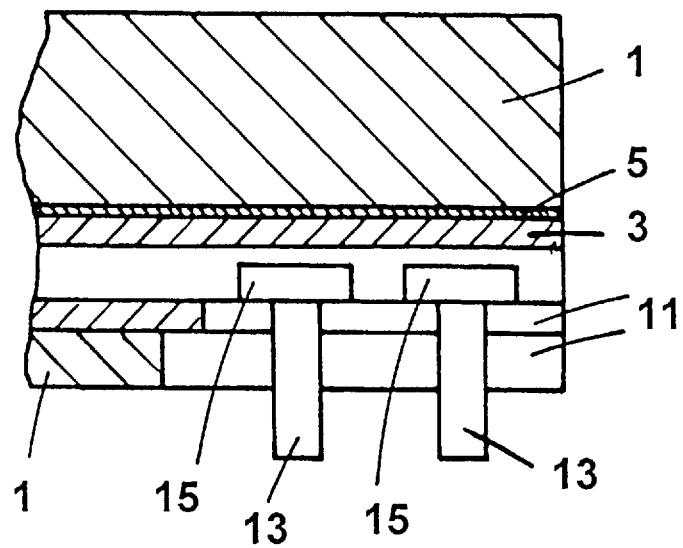
FIGS. 5 and 6 are longitudinal sections of the ends of the pantograph slipper of FIG. 1.

FIG. 5 illustrates a possible construction of the ends of the pantograph slipper shown in FIG. 1. A longitudinal slit 11 is formed in the downwardly oriented sides of both carbon brush 1 and carrier 3. Mounting bolts 13 extend through slits 11 and include heads 15 on the inside of carrier 3 which are suitably attached thereto.

Figure 6:
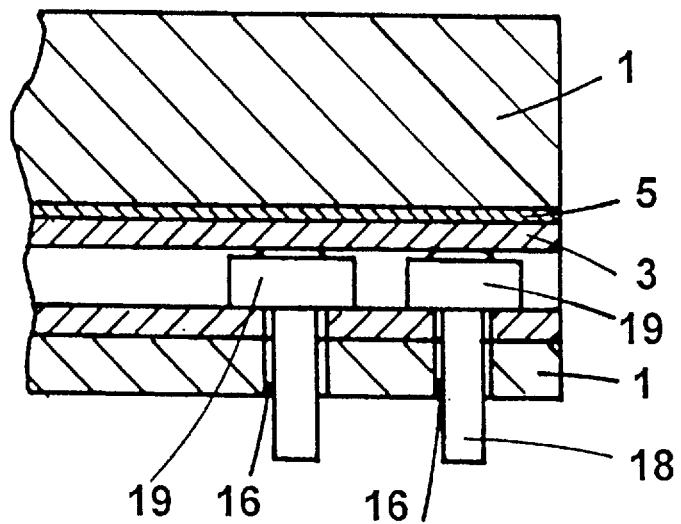

FIG. 6 illustrates another embodiment for constructing the ends of the pantograph slipper shown in FIG. 1. At least one opening 16 is formed in the downwardly facing walls of both carbon brush 1 and carrier 3. Mounting bolts 18 extend through the opening and engage nuts 19 on the inside of the carrier.

When mounting bolts 18 are placed in position before carrier 3 is formed and cured, the forming and curing of the carrier embeds the bolts in the carrier.

Figure 7:
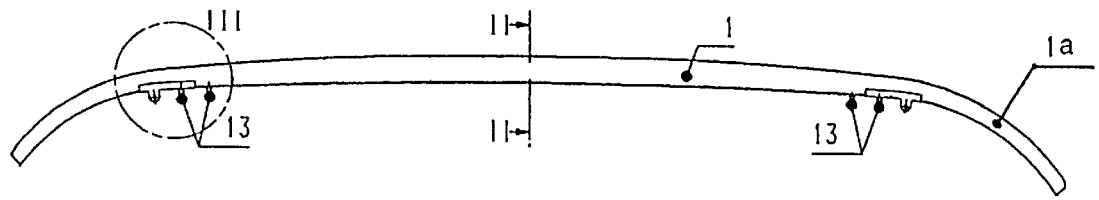
FIGS. 7, 8 and 9 show further embodiments of the present invention and are a side elevation, a cross-section, and a detailed, enlarged view, respectively, of the pantograph slipper.

FIG. 7 is a side view of a pantograph slipper constructed in accordance with the present invention and illustrates at the ends thereof downwardly curved, lateral pantograph horns 1a which are integrally formed with the remainder of the pantograph and which are provided for guiding overhead wire onto the carbon brush.

Figure 8:
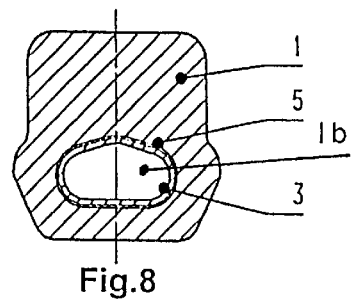

FIG. 8 is a cross-sectional view taken on line II—II of FIG. 7. Carbon brush 1 completely surrounds a longitudinally continuous hollow space 1b which has a generally oval cross-section that includes, on its upper side, a slightly gable-shaped portion. A tubular carrier 3 is disposed in hollow space 1b and has been deformed to conform its shape to that of the inner surface of the hollow space, as was described above. A thin conductive layer 5, for example a wire mesh, completely surrounds carrier 3 and is disposed between the carrier and the inner surfaces of the brush defining hollow space 1b.

Hollow space 1b and carrier 3 disposed therein extend over the entire length of the pantograph slipper shown in FIG. 7, including its lateral horns 1a so that the horns are also supported by the carrier. The tubular blank used for carrier 3 is slidably inserted into hollow space 1b in a sufficiently softened or flexible condition so that it conforms itself to the curved shape of the horns during its insertion.

Figure 9:
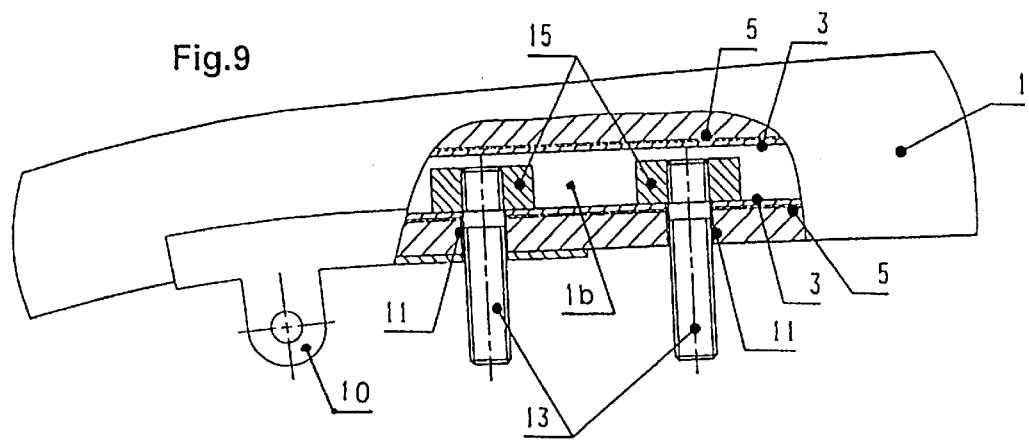

FIG. 9 is the detail encircled by line III of FIG. 7 and illustrates the transition between the center portion of the pantograph slipper and horn 1a. Carbon brush 1 has a hollow interior space 1b which extends over its entire length. A relatively thin-walled, tubular carrier 3 is disposed in the hollow space and surrounded by conductive layer 5. Mounting bolts 13 extend through holes 11 in the downwardly oriented walls of carbon brush 1, and they engage nuts 15 on the inside of carrier 3. Bolts 13 are used for mechanically securing the slipper to a pantograph structure. A metal contact element 10, in the illustrated embodiment conductively secured to the outer surface of carbon brush 1, is provided for establishing electric contact to the slipper. Alternatively, metal contact element 10 can be electrically coupled with the electrically conductive layer 5 between carrier 3 and carbon brush 1 through an opening in the downwardly oriented wall of the brush.

Unlike conventional methods for manufacturing pantograph slippers by bonding, soldering or wedging the carbon brush onto the carrier of a pantograph slipper, the method of the present invention directly conforms the shape of the carrier to that of the hollow interior space of the brush in essentially a single step requiring virtually no further manufacturing steps. Thus, the shaping of the carrier and its mechanical and electrical connection with the carbon brush all occur at once in a single step. The method provides a truly integrally formed pantograph slipper, including integrally constructed lateral pantograph horns. This provides optimal strength for the slipper and long, trouble-free operation since there are no intermediate connections between the brush, the horns, and the carrier.

The uniform adaptation of the carrier shape and size to that of the carbon brush leads to a uniform, mechanical support for the brush as well as an optimal distribution of the electric current within the slipper. The danger of local current overloads is thereby minimized. Further, compared to conventional slippers, the structural stability and elasticity of the slipper of the present invention is significantly greater. Deformations of the slipper resulting from differences in the thermal expansion of the carrier and the carbon brush are minimized by the present invention because it places the carrier on the interior of the brush, which renders the slipper substantially tension-free.

What is claimed is:

1. A method for making a slipper for current collectors, the slipper comprising an elongated carbon brush with a tubular, U-shaped or C-shaped cross-section and which has a longitudinally extending hollow space surrounded on at least three sides by the carbon brush, and an elongated carrier disposed in the hollow space which supports the carbon brush, the method comprising the steps of:

providing a blank of the carrier having cross-sectional dimensions which are smaller than those of the hollow space of the carbon brush;

inserting the blank in the hollow space of the carbon brush; and shaping the blank into the finished carrier by expanding the cross-section of the blank into contact with at least a portion of inner surfaces of the carbon brush defining the hollow space.

2. A method according to claim 1, in which an electrically conductive layer is arranged between the blank and at least a portion of the surfaces defining the inner space.

3. A method according to claim 1, in which the blank is tubular, and expanding the blank by subjecting the interior of the blank to a pressurized medium.

4. A method according to claim 3, wherein the pressurized medium is heated thereby supporting the heating of the blank or causing the heating of the blank needed for the curing of the blank.

5. A method according to claim 4, wherein a liquid is used as the pressure medium.

6. A method according to claim 5 wherein the liquid is a mixture of water and alcohol.

7. A method according to claim 1, wherein the blank is made of an uncured plastic, and curing the plastic during or after it has been deformed.

8. A method according to claim 7, wherein the plastic is a fiber-reinforced plastic.

9. A method according to claim 7, wherein the blank is made electrically conductive by placing conductive fibers, particles, or materials onto the surface of the blank.

10. A method according to claim 1, wherein the blank is made of an aluminum alloy capable of being foamed with a foaming agent, and wherein the blank is shaped by foaming it.

11. A method according to claim 1, wherein at least one of either an electric contact element or a mechanical attachment device is at least partially embedded in the blank prior to the blank's deformation and wherein at least one of either the contact element or mechanical attachment device remains embedded in the carrier when the carrier is deformed.

12. A method according to claim 1 wherein the blank is cured, and wherein at least one of either an electric contact element or a mechanical attachment device is at least partially embedded in the blank prior to the blank being cured and wherein at least one of either the contact element or mechanical attachment device remains embedded in the carrier when the carrier is cured.

* * * * *